United States Patent [19]
Campo

[11] Patent Number: 6,073,033
[45] Date of Patent: Jun. 6, 2000

[54] PORTABLE TELEPHONE WITH INTEGRATED HEADS-UP DISPLAY AND DATA TERMINAL FUNCTIONS

[75] Inventor: James A. Campo, Brunswick, Ohio

[73] Assignee: Telxon Corporation, Akron, Ohio

[21] Appl. No.: 08/742,034

[22] Filed: Nov. 1, 1996

[51] Int. Cl.[7] .............................. H04N 7/14; H04M 1/05; H04Q 7/20

[52] U.S. Cl. .......................... 455/566; 455/568; 455/569; 348/14

[58] Field of Search ..................................... 455/566, 568, 455/569, 575, 90; 379/88.13, 93.17, 110.01, 433, 434; 348/14

[56] References Cited

U.S. PATENT DOCUMENTS

| | | | |
|---|---|---|---|
| 4,484,029 | 11/1984 | Kenny ...................................... | 455/568 |
| 5,048,077 | 9/1991 | Wells et al. ........................... | 379/93.17 |
| 5,311,302 | 5/1994 | Berry et al. ............................... | 348/14 |
| 5,412,417 | 5/1995 | Tozuka ...................................... | 348/14 |
| 5,436,954 | 7/1995 | Nishiyama et al. ..................... | 455/566 |
| 5,485,504 | 1/1996 | Ohnsorge ................................. | 455/566 |
| 5,491,507 | 2/1996 | Umezawa et al. ........................ | 348/14 |
| 5,504,813 | 4/1996 | Takasaki .................................. | 379/433 |
| 5,526,411 | 6/1996 | Krieter ................................. | 379/110.01 |
| 5,550,754 | 8/1996 | McNelley et al. ......................... | 348/14 |

*Primary Examiner*—Willis R. Wolfe
*Attorney, Agent, or Firm*—Renner, Otto, Boisselle & Sklar, PLL

[57] ABSTRACT

A portable telephone device with telephone, data terminal and/or heads-up display functions in an integrated package having a size and weight on the order of conventional portable wireless telephones. The device includes a handheld body structure having a main body portion and a heads-up display body portion. The main body portion may be held in a normal telephone handset position at a side of a user's head to position audio input and output transducers in functional relationship to the user's mouth and adjacent ear. The heads-up display body portion is rotatable from a storage position to an operative position for locating a display in front of the adjacent eye of the user for display of data. The device further comprises, within the hand-held body structure, a processor and associated memory, a keyboard, a transceiver for voice and data communications with a remote telephone and/or data terminal unit, and a battery compartment for housing a battery that supplies power to the device.

35 Claims, 5 Drawing Sheets

Fig. 11

PORTABLE TELEPHONE WITH INTEGRATED HEADS-UP DISPLAY AND DATA TERMINAL FUNCTIONS

The invention herein described relates generally to telephone devices and, more particularly, to a portable telephone device with an integrated heads-up display and data terminal capability.

BACKGROUND OF THE INVENTION

In recent years, the use of portable hand-held data terminal units, wireless portable telephones and heads-up display units has become widespread. Portable hand-held data terminal units, for example, are used to track inventory in retail stores and warehouses. Wireless portable telephones have found widespread domestic use as well as commercial use as an alternative to the hard-wired telephone. Heads-up display units have found use in a variety of applications, particularly where it is desirable to free both hands of the user for carrying out other functions.

Portable hand-held data terminal units typically comprise a hand-held housing including a battery, a liquid crystal display (LCD), an alpha-numeric keyboard, a central processing unit (CPU) for processing of data, a memory for storage of data, a speaker and a wireless and/or hard-wire communication device or devices. Wireless communication devices include infra-red or radio transceivers while hard-wire communication devices include serial, parallel and modem interface devices. Typical infrared or radio transceivers can sustain data rates to a host computer from 9600 bps to 10 mbps depending on the sophistication, cost and range required by a user's application. The hand-held data terminal units are often provided with an optional bar code scanning device.

Wireless portable telephones generally comprise a handset containing a battery, a numeric keypad for dialing and limited control functions, a processing unit for processing data, a speaker, a microphone and a radio transceiver for communications. The radio transceivers normally support wireless data rates up to 32 kbps which is adequate for the transmission of good quality voice and control signals over a wireless telephone connection. However, this data rate is not sufficient to handle many other high density data transmissions such as that needed to provide a video display. Some wireless portable telephones also have a small LCD display of 10 to 16 characters to provide for display of telephone numbers and call status. The display usually is located on the side of the phone placed against the user's head when talking and listening, and thus the display cannot be viewed during such use of the phone.

Heads-up display units (non-projection type) have comprised a head-mount mechanism from which a small LCD display is suspended approximately 2 to 5 cm in front of one eye of the user. Although the display may have, for example, a 2.5 cm diagonal dimension, a lens is often provided in front of the display to create a virtual image that appears many times larger. The display may provide in essence the equivalent of a typical display associated with a personal computer, such displays commonly consisting of a 25 line by 80 character per line screen. A cable or cables from the head-mount mechanism provide for connection to a computer unit carried on the user's body by suitable means. The computer unit typically contains a battery, display drivers for the LCD display, a CPU for processing data, memory for storage of data and one or more wireless or hard-wire communication devices. In some cases, a microphone and earphone are attached to the head-mount mechanism and are either cabled to the body-mounted computer or communicate therewith via low power radio transceivers.

By way of example, the functions afforded by the aforesaid devices may have use by a doctor that receives an emergency call from a nurse within a hospital. The doctor may be in his/her office, at a meeting, at lunch, etc. Today, the doctor could carry a wireless pager or wireless telephone whereby he/she may be contacted by the nurse. The patient emergency may be discussed over the wireless telephone carried by the doctor or, if the doctor had been contacted by a wireless pager, over a telephone used to call back the nurse. Verbal communications over a telephone, however, may not provide the doctor with all the information he desirably should have to adequately diagnose the patient emergency. For instance, it may be desirable for the doctor to review the patient's medical records maintained in the hospital's records data base while talking to the nurse. An attempt to satisfy this need using known wireless telephones, heads-up display units and wireless data terminal units would require the doctor to carry a data terminal unit, wear a heads-up display unit and also carry a wireless telephone. Such an arrangement would be unacceptable because of ergonomics, cost, weight and other factors.

It would be advantageous if there were a small portable device that the doctor could carry and that would enable voice communications simultaneously with data terminal functions and full screen display of data. This would enable the doctor to converse with the nurse while viewing the patient's medical records on a display just as if he/she was at a computer terminal. Not only would such a device contribute to increased quality of health care with reduced cost and time savings, such a device would have many other desirable, beneficial and advantageous applications as well.

SUMMARY OF THE INVENTION

The present invention provides a telephone device with telephone, data terminal and/or heads-up display functions in an integrated package having a size and weight on the order of conventional portable wireless telephones. More particularly, the device includes a hand-held body structure having a main body portion and a heads-up display body portion. The main body portion may be held in a normal telephone handset position at a side of a user's head to position audio input and output transducers in functional relationship to the user's mouth and adjacent ear. The heads-up display body portion is extendable from a storage position to an operative position for locating a display in front of the adjacent eye of the user for display of data. The device further comprises, within the hand-held body structure, a processor and associated memory, a keyboard, a transceiver for voice and data communications with a remote telephone and/or data terminal unit, and a battery compartment for housing a battery that supplies power to the device.

In a preferred embodiment of the invention, the main body portion of the hand-held body structure has located on a front side or face thereof a keyboard and small display (telephone display) that are used for dialing and phone functions. A touch screen may be provided on the telephone display for touch input of a user selection. The audio input and output transducers, e.g., a microphone and speaker, are located at opposite ends of the main body portion and at a spacing that will position the microphone in the vicinity of the user's mouth when the speaker is held adjacent one of the user's ears.

Further in accordance with a preferred embodiment of the invention, the heads-up display body portion of the hand-held body structure is in the form of a display arm pivotally mounted to the main body portion at the back side thereof. The display arm preferably can pivot in opposite directions from a neutral or storage position to enable selective use of the heads-up display on either the left or right side of the user's head. A position sensor is provided to detect the position of the pivot arm and provide an output for controlling one or more operational states of the heads-up display or the device in general. For example, the output of the position sensor may be used to automatically invert the orientation of the image displayed on the heads-up display, as the physical orientation of the heads-up display when in the left side position of the display arm will be reversed top-to-bottom and right-to-left with respect to the right side position of the display arm. Movement of the display arm out of and into the neutral position may be used to power-up and power-down the heads-up display and/or device for convenience and battery conservation purposes. The pivot arm also may be telescopic for adjusting the distance between the heads-up display and the main body portion containing the telephone speaker to accommodate differences in head sizes, eye position and user preferences in either operative position of the display arm.

A preferred embodiment of the invention also comprises one or more selector components on each side edge of the main body portion. The logical-to-physical mapping of the functions attributed to the selector components preferably are automatically set in response to the detection of a selected position of the display arm, thereby to maintain the same user interface whether the device is held on the left or right side of the user's head. In addition, the selector components may be assigned a different set of functions for use when the heads-up display is not being used. The functions that may be assigned to the selector components include up and down scrolling of the heads-up display screen by line, page or otherwise, tabbing right or left, providing a yes/no response to a query on the display screen, allowing the processor to distinguish between a normal telephone speech mode and a system voice command input mode, etc.

A further advantageous feature of the invention is use thereof in a speaker phone mode. The device may have incorporated therein a sensor for detecting a horizontal or other specific orientation of the device and in response thereto automatically increasing the volume of the speaker. The processor can allow the speaker phone mode to be enabled only in such orientation. When the device is no longer in such orientation, the speaker volume is automatically decreased to a level normally associated with handset volume levels.

With the foregoing in mind, the invention, according to a first main aspect thereof, provides a telephone device with integrated heads-up display, comprising input and output audio transducers; a heads-up display; communications circuitry for receiving and transmitting voice data and non-voice data to and from a remote site; electronic circuitry for operatively interconnecting the input and output transducers and the heads-up display to the communications circuitry; and a body structure housing the input and output audio transducers, heads-up display, communications circuitry and electronic circuitry. The body structure includes a main body portion and a display body portion. The display body portion includes the heads-up display and is mounted to the main body portion for movement between a neutral position and at least one operative position for locating the heads-up display in front of a user's eye when the body structure is positioned adjacent one side of a user's head.

According to another main aspect of the invention, a portable telephone device with integrated heads-up display, comprises input and output audio transducers; a heads-up display; wireless communications circuitry for receiving and transmitting voice data and non-voice data to and from a remote site; electronic circuitry for operatively interconnecting the input and output transducers and the heads-up display to the wireless communications circuitry; and a hand-held body structure housing the input and output audio transducers, heads-up display, wireless communications circuitry and electronic circuitry.

According to still another main aspect of the invention, a telephone device with integrated heads-up display, comprises input and output audio transducers; a heads-up display; communications circuitry for receiving and transmitting voice data and non-voice data to and from a remote site; electronic circuitry for operatively interconnecting the input and output transducers and the heads-up display to the wireless communications circuitry; a hand-held body structure housing the input and output audio transducers, heads-up display, communications circuitry and electronic circuitry; and a selector device for switching between a normal telephone speech mode and a system voice command input mode.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Referring now in detail to the drawings and initially to FIGS. 1–4, an exemplary telephone device according to a preferred embodiment of the present invention is designated generally by reference numeral 20. The telephone device 20 comprises a hand-held body structure 22 having a main body portion 24 and a heads-up display body portion 26. The main body portion 24 includes a housing or casing 28 which houses various components including a microphone 30 or other audio input device 30, a speaker 32 or other audio output device 32, a display 34, a keypad 36 or other data input device, a communications module 38, a direct connect communications port 40, and one or more circuit boards 42 and 43. The main body portion 24 also carries a telescoping antenna 44 which may be retractable into the casing 28 when not in use. Preferably, two circuit boards 42 and 43 are used and canted with respect to one another to accommodate a desired curvature of the main body portion casing 28 typical of conventional handsets. The circuit boards can be connected by a cable or may be otherwise connected such as by an integral rigid flex hinge with associated electrically connecting conductive paths. As shown, some of the components, such as the keypad 36 and speaker 32, may be mounted to the circuit boards.

In addition, there is provided a power supply which in the illustrated embodiment is in the form of a battery pack 45. The battery pack 45 is detachably insertable into a pocket or recess on the back side of the casing 28. In a well known manner, the battery pack 45 can be externally configured to match the contour of the casing 28 to provide an aesthetically pleasing appearance while also providing an easy to hold and/or cradle configuration for the user. In a well known manner, the battery pack can have contact pads 46 or the like for interfacing with contacts in a cradle, docking station, charger or the like for recharging the battery pack. The main body portion 24 also is provided with one or more selector devices, for example switches 47 and 48, on opposite side edges thereof for manipulation by a user's thumb and index fingers when the main body portion is being held by the user like a telephone handset in a conventional manner.

The heads-up display body portion 26 includes a housing or casing 50 which houses a heads-up display module 52 that has a display 54. The heads-up display body portion 26 is mounted to the main body portion 24 for movement from a neutral or storage position to at least one operative position for locating the display 54 of the heads-up display module 52 in front of a user's eye when the main body portion 24 is held adjacent a user's head with the speaker 32 positioned at the user's ear. The heads-up display module, for example, may be of LCD type or FED type, the latter providing for reduced size and power consumption, and eliminating the need for a back light. The heads-up display module preferably includes a lens in front of its display screen to produce a virtual image of considerably larger size. For example, an LCD display having a screen size on the order of 2.5 cm diagonal measurement can be given the appearance of a typical desktop monitor having a screen size on the order of about a 35 cm diagonal measurement when the display is positioned about 2.5 cm to 5.0 cm in front of a user's eye. Preferably, the heads-up display module is VGA compatible supporting 640 by 480 pixels resolution in monochrome or color, for display of a typical 25 line by 80 character screen format. However, other resolutions and types of display modes may be used.

Figures 1, 2:
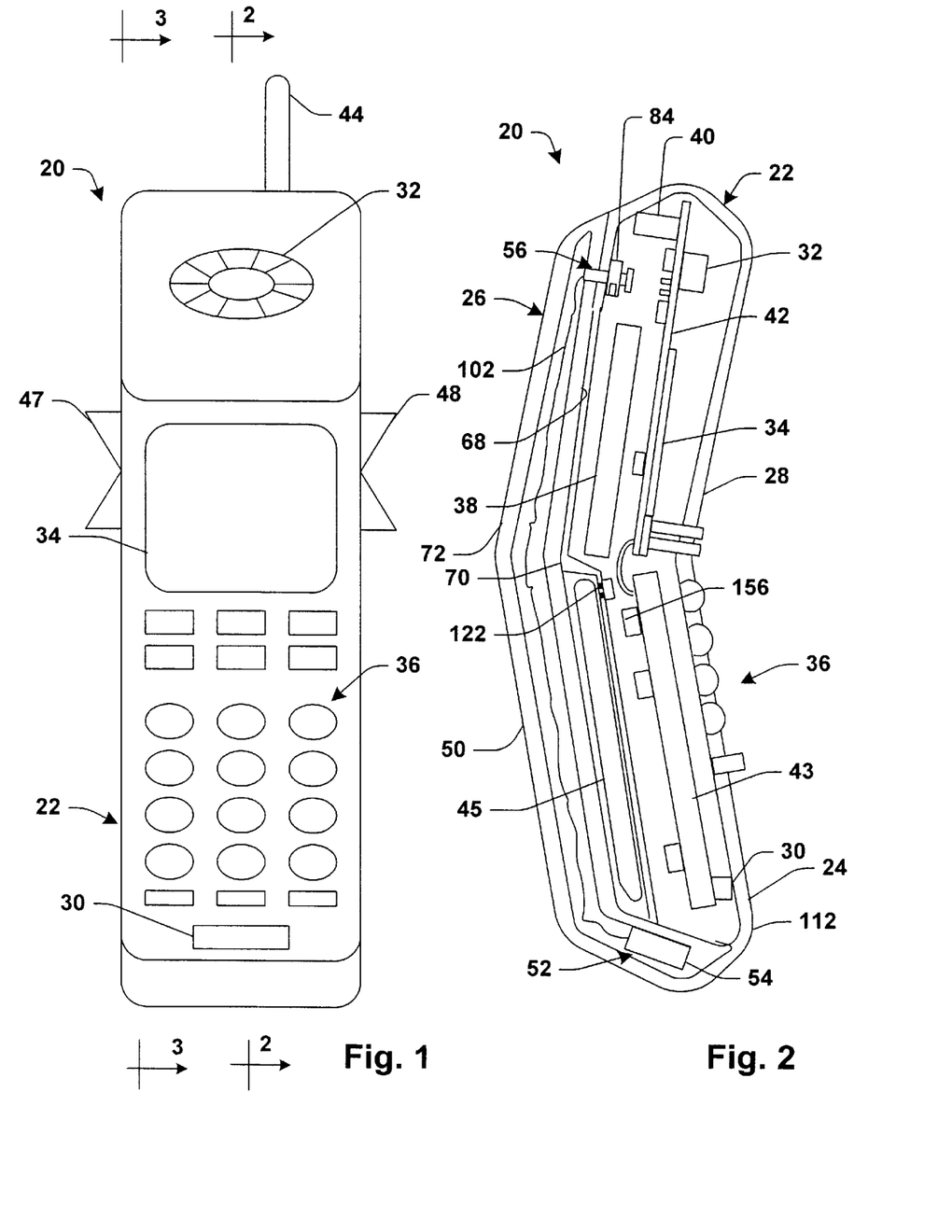
FIG. 1 is front elevational view of a portable wireless telephone device having integrated heads-up display and data terminal capability according to the invention.
FIG. 2 is a cross-sectional view of the telephone device, taken along the line 2—2 of FIG. 1.
Figure 3:
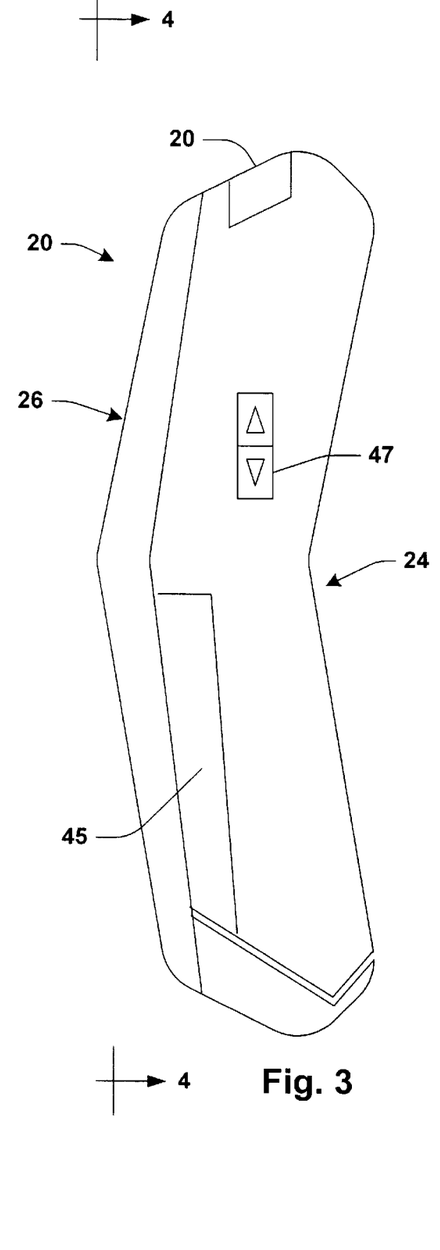
FIG. 3 is a side elevational view of the telephone device, looking from the line 3—3 of FIG. 1.
Figure 4:
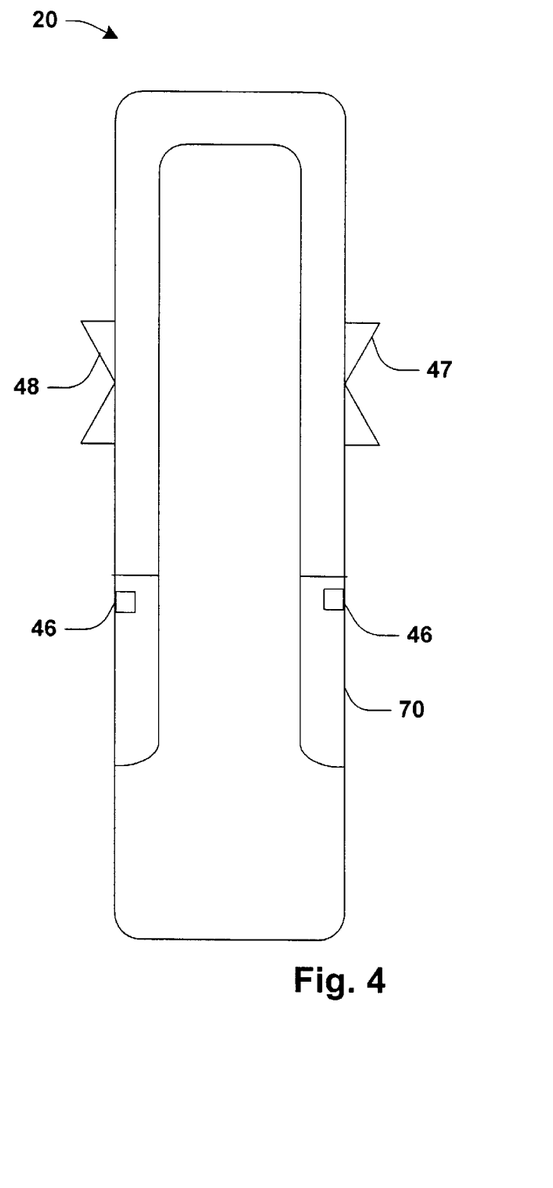
FIG. 4 is a rear elevational view of the telephone device, looking from the line 4—4 of FIG. 3.
Figure 7:
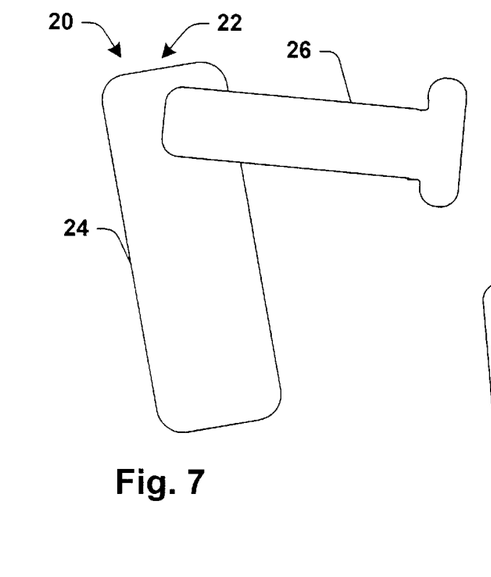
FIG. 7 is a rear elevational view of the telephone device showing the heads-up display portion rotated to a right-hand use position.
Figure 8:
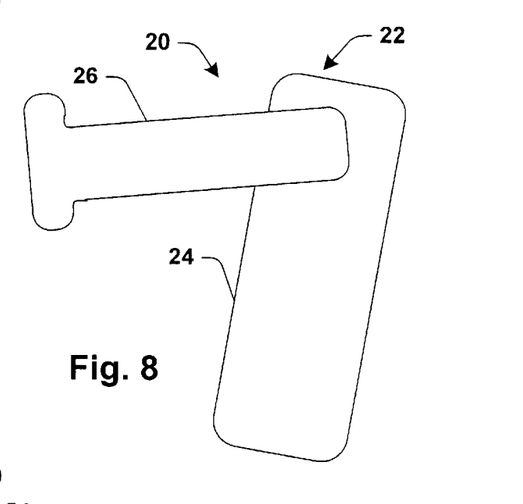
FIG. 8 is a rear elevational view of the telephone device showing the heads-up display portion rotated to a lefthand use position.

In the illustrated preferred embodiment, the heads-up display body portion 26 is in the form of a display arm that is pivotally mounted by a pivot connection 56 to the main body portion 24. As best seen in FIG. 4, the heads-up display body portion or pivot arm 26 is pivoted at one end about an axis generally aligned with the speaker 32 in the main body portion 24, while the heads-up display module 52 is located at the opposite or distal end of the display pivot arm. Accordingly, the heads-up display pivot arm 26 can be rotated from its neutral or storage position shown in FIGS. 1–4 to an operative position locating the heads-up display 54 forwardly of the main body portion 24, as shown in FIG. 7. Preferably, the pivot arm can be rotated in the opposite direction from its neutral position as shown in FIG. 8, this enabling right-hand and left-hand usage of the device 20.

Figure 9:
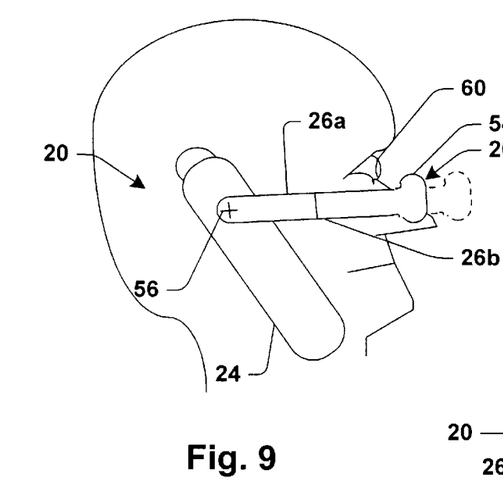
FIGS. 9 and 10 are side and plan views showing the telephone device positioned adjacent a user's head.
Figure 10:
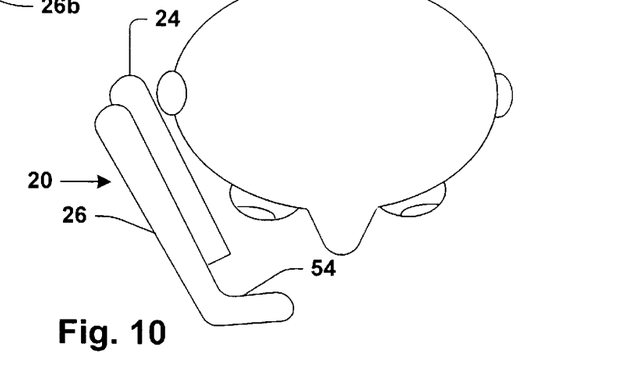

The ergonomics of the device 20 are schematically illustrated in FIGS. 9 and 10. For use of the heads-up display 54, the heads-up display pivot arm 26 is rotated about 45° from its neutral position aligned with the main body portion 24, in one direction for use on the left side of a user's head or the opposite direction for use on the right side of the user's head as shown in FIGS. 8 and 9, respectively. The angle may be adjusted as needed, for example between 30° and 60°, to locate the heads-up display 54 in front of the user's eye 60 when the main body portion 24 is held like a handset in a conventional manner with the speaker end of the main body portion positioned at the user's ear 62 and main body portion extending at about a 45° angle to the vertical axis of the user's head to locate the microphone end of the main body portion in the vicinity of the user's mouth. If desired, the heads-up display pivot arm may formed by two telescoping sections, as indicated at 26a and 26b in FIG. 9, for permitting adjustment of the distance the heads-up display is spaced in front of the user's eye (as indicated in broken lines) to accommodate differences in head sizes, eye position and user preferences. If desired, additional degrees of movement of the heads-up display may be provided, such as by use of a sliding track union between the heads-up display end of the heads-up display pivot arm and the balance thereof, to permit adjustment for user preference. Generally, the heads-up display 54 should be located about 3 cm to 4 cm in front of the user's eye. The distal end of the heads-up display pivot arm preferably is canted relative to the major extent of the heads-up display pivot arm for positioning the heads-up display at a desired viewing angle in front of the user's eye. It is noted that the curvature of the heads-up display pivot arm, which corresponds to the curvature of the main body portion, contributes to the optimal positioning of the heads-up display in front of and at a desired angle to the user's eye.

In the neutral or storage position of the heads-up display pivot arm 26 shown in FIGS. 1–4, the inner or front side 68 thereof closely conforms to the rear side 70 of the main body portion 24. Also, a back side 72 of the heads-up display pivot arm 26 is contoured so that together the heads-up display pivot arm and main body portion may still be comfortably gripped for use of the device with the heads-up display 54 in its storage position, as for normal telephone usage. Overall, the telephone device may have the general appearance of a typical wireless telephone, inasmuch as the screen of heads-up display, which faces the front side of the heads-up display pivot arm, will be hidden from view by the main body portion 24. Also, the main body portion will function to cover the heads-up display screen and thereby protect it from damage.

Figure 5:
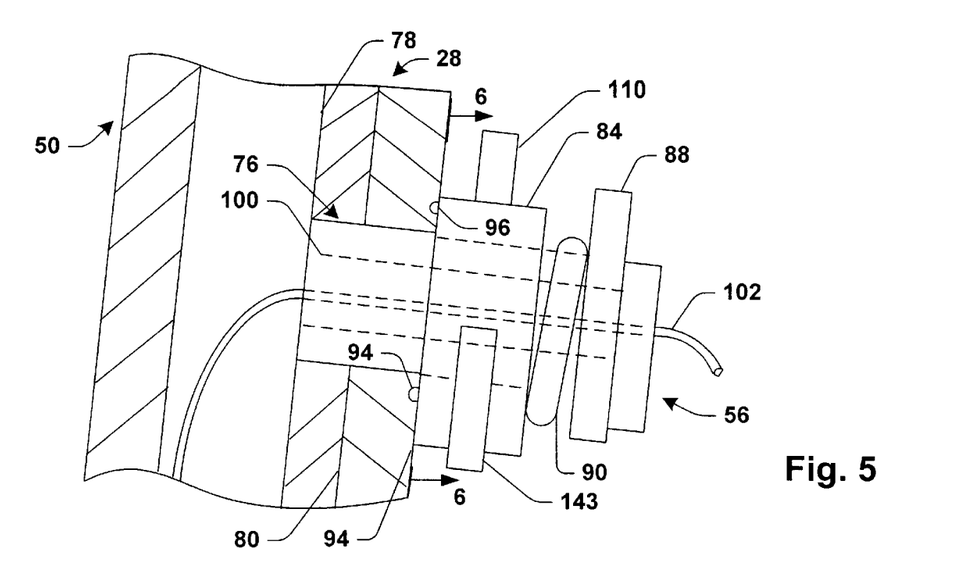
FIG. 5 is a partial enlargement of FIG. 2, showing details of a pivot connection between a main body portion of the telephone device and a heads-up display portion, the latter being shown in a neutral or storage position.
Figure 6:
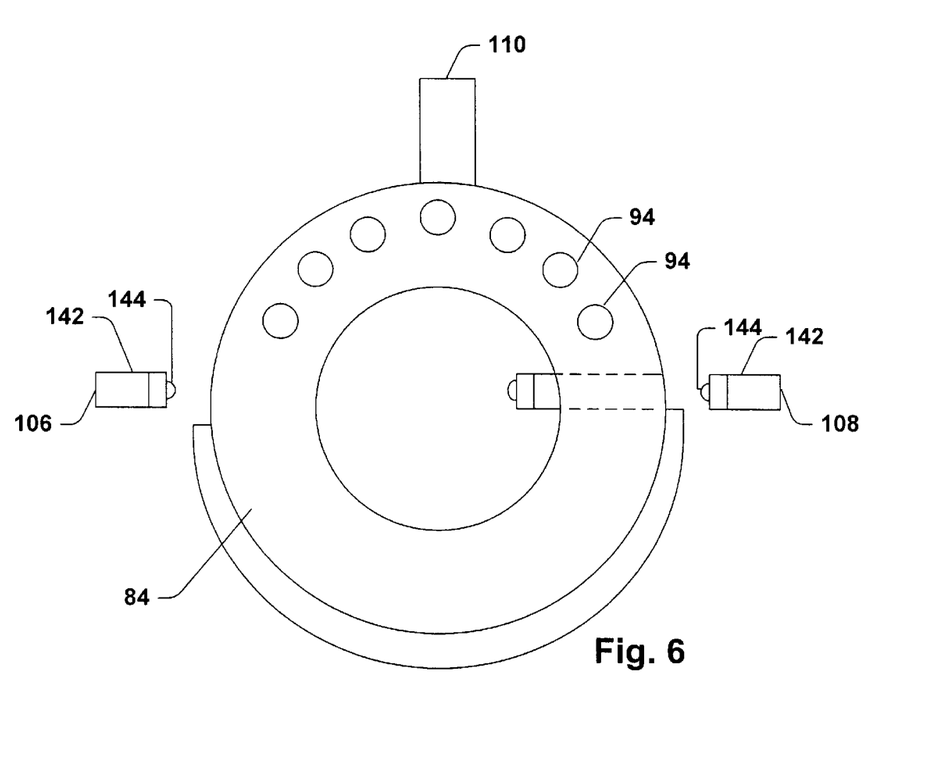
FIG. 6 is a cross-sectional view of the pivot connection taken along the line 6—6 of FIG. 5.

Referring now to FIGS. 5 and 6, an exemplary pivot connection 56 is illustrated. The pivot connection includes a pivot support tube or rod 76 fixed to and projecting forwardly from the inner wall 78 of the heads-up display pivot arm casing 50. The pivot support rod 76 extends through an aperture in the back wall 80 of the main body portion casing 28. The aperture may be provided with a suitable bearing (not shown) for smooth rotation of the pivot support rod relative to the main body portion. Inwardly of the back wall 80, a collar 84 is keyed to the pivot support rod for rotation therewith by a key 86. The collar is retained on the pivot support rod by a retaining device such as a clip or nut 88. Interposed between the retaining nut and collar is a resilient element, such as a spring washer 90. The spring washer biases the outer side of the collar against an inner surface of the back wall 80. The inner surface of the back wall 80 and outer side of the collar include cooperating detents 94 and recesses 96 disposed along a circle concentric with the axis of the pivot support rod 76. As seen in FIG. 6, the detents 94 are circumferentially equally spaced apart, as are the recesses, at the same spacing. Together, the recesses and detents cooperate to hold the heads-up display pivot arm relative to the main body portion at any one of plural discrete angularly spaced apart positions. In the illustrated embodiment, the angularly spaced positions are disposed over a range of 0° to about 60° at increments of about 15°.

The pivot support rod 76 has a passage 100 extending therethrough for passage of an electrical cable or cables from the heads-up display pivot arm 26 to the main body portion 24. In particular, the heads-up display module 52 is connected to the circuit board 42 by an electrical cable 102 which passes through the passage 100 in the pivot support rod. Preferably, the permitted range of rotation of the pivot support rod is limited to prevent excessive twisting of the cable passing therethrough which might cause damage to the cable. In the illustrated embodiment, the main body portion 24 is provided with fixed abutments or stops 106 and 108 which are positioned to interfere with a stop guard 110 provided on the collar 84. The stops are located to permit about 60° of rotation of the heads-up display pivot arm in either direction from the neutral position of the heads-up display pivot arm. Preferably, there is also provided a latching mechanism for more securely holding the heads-up display pivot arm in its neutral position when not in use. For example, the heads-up display pivot arm can be provided at the heads-up display end thereof with a lip 112 or other releasable interlocking device cooperative with the main body portion to hold the heads-up display pivot arm in its neutral position and further to provide additional stress relief to the pivot connection, for added protection against shock forces that might arise from accidental droppage of the device.

Figure 11:
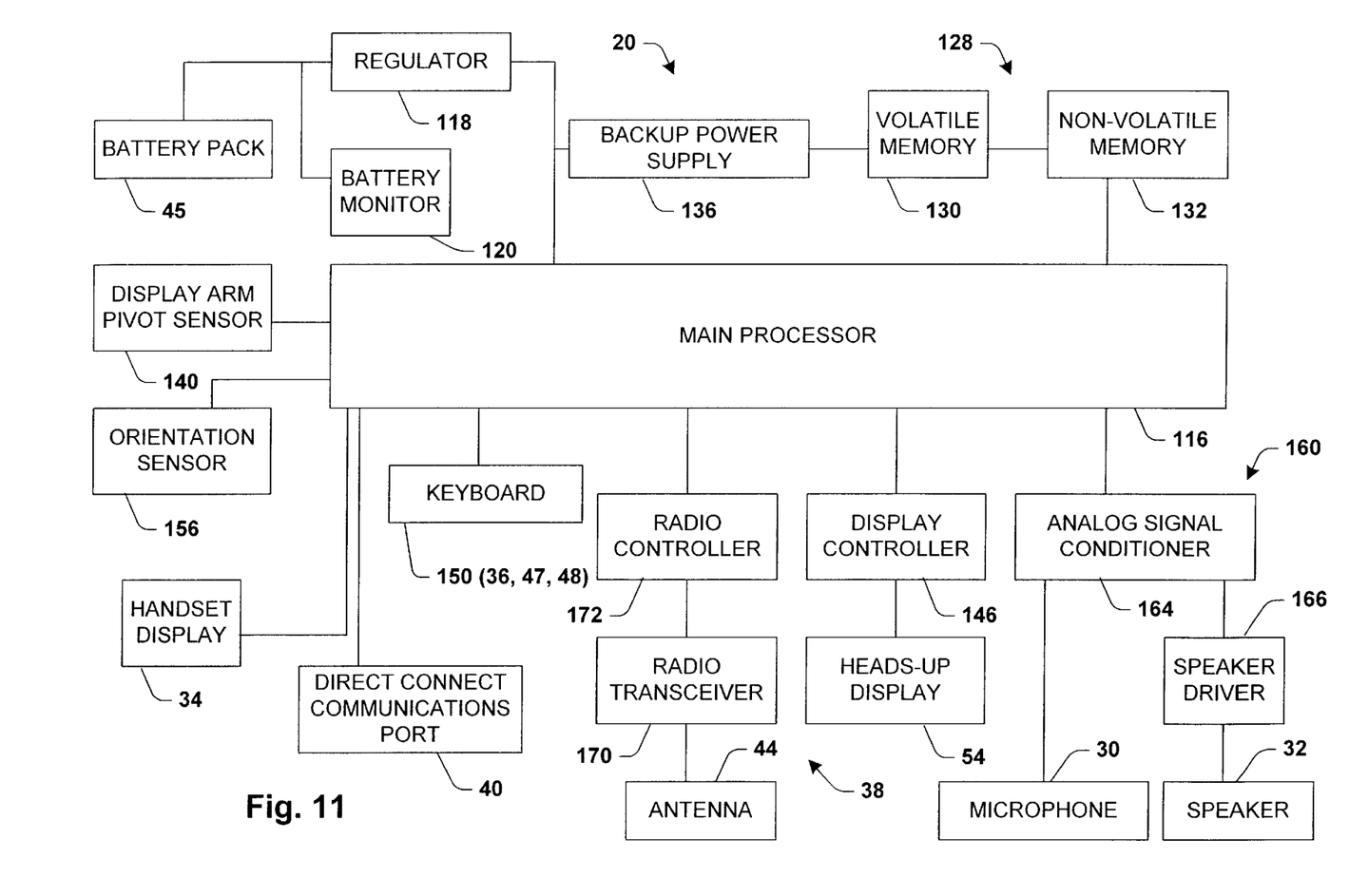
FIG. 11 is a block diagram of the telephone device in accordance with the present invention.

Having described above the physical positioning of various components of the device 20, further details thereof and their functional interconnectivity and associated electrical circuitry will now be described with primary reference to FIG. 11. The electrical circuitry of the device includes a main processor 116 for controlling the operation of the device 20, which processor may include a microprocessor and/or one or more application specific integrated circuits (ASIC's). As will be appreciated, many of the components of the device can be combined into one or more integrated circuits, thereby allowing the size of the device to be reduced together with manufacturing costs and assembly costs.

The processor 116 and other electrical components of the device are powered by the battery pack 45 in a suitable manner. For example, in the illustrated embodiment, the battery pack provides power to a regulator 118 which may be of linear or switching topology, or other suitable type. Preferably there is provided a battery monitor circuit 120 which provides, to the processor 116, battery status information such as low battery and battery disconnect conditions. The regulator and battery monitor circuit can be located on the circuit board 43 (FIG. 2) which has contacts 122 for connecting to mating contacts on the battery pack when the battery pack is attached to the main body portion 24. The battery pack, which is preferably user removable and rechargeable, may include a Nicad, NiMH, lithium ion or other suitable type of battery. Provision may also be made for supply of power from an external source, such as an AC adaptor and/or DC adapter for connecting to an automotive electrical system.

The processor 116 has associated therewith a memory 128 including both volatile memory 130 and non-volatile memory 132. The memory 128, in particular the non-volatile memory, stores the appropriate operating code to be executed by the processor for carrying out the functions described herein. Additionally or alternatively, the operating code can be loaded via the direct connect port 40 or via the communications module 38. The manner in which the processor can be programmed to carry out the various functions will be readily apparent to those having ordinary skill in the art based on the descriptions herein. Accordingly, additional detail as to the specific programming has been omitted. As will also be appreciated by those skilled in the art, the processor 116 can use a multi-tasking operating system to handle the various asynchronous events arising from the various components of the device.

As is preferred, a backup power supply 136, such as a super cap or small lithium battery, is provided to prevent loss of data in the volatile memory 130 if power from the battery pack is lost, for example from a low battery condition or during replacement of a spent battery pack with a charged battery pack.

During normal operation of the device, the processor 116 monitors the output of a heads-up display arm position sensor 140. The heads-up display arm position sensor 140 may be any suitable device disposed in the device for sensing the position of the heads-up display pivot arm 26 relative to the main body portion 24. In the illustrated preferred embodiment wherein the heads-up display pivot arm is pivotable in either direction from the neutral position thereof for left-hand and right-hand usage, the heads-up display arm position sensor 140 reports at least three positions of the heads-up display pivot arm. Specifically, the heads-up display arm position sensor reports the neutral, clockwise-rotated and counterclockwise-rotated positions of the heads-up display pivot arm. The sensing of the rotational position of the heads-up display pivot arm can be accomplished in a variety of ways.

For example, as shown in FIGS. 5 and 6, two micro switches or contacts 142 are operatively positioned on stops 106 and 108, respectively, and are situated to engage with a flange 143 on the collar 84. Each of the micro switches 142 includes a spring-biased lever or plunger 144 for engaging the flange 143. When the heads-up display pivot arm is in its neutral position, both micro switches are in an open position thus indicating that the heads-up display pivot arm has not been rotated for viewing the heads-up display. However, when the collar 84 is rotated due to rotational movement of the heads-up display pivot arm, the flange will engage one of the spring-biased levers/plungers 144 such that the spring-biased lever/plunger places the associated micro switch in a closed position. Depending on whether the heads-up display pivot arm 26 is rotated in a clockwise or counter-clockwise direction, only one of the respective micro switches 142 will be closed, thus enabling differentiating between a right-handed or left-handed user. In another technique, an optical sensor can be mounted in the main body portion to sense a slotted disc mounted to the pivot support rod for rotation with the pivot support rod. Still another technique would be the use of a potentiometer operatively coupled to the display arm, for example to the pivot support rod 76 (FIG. 5), for providing a continuous analog signal such that the actual angle information could be reported to the processor 116.

Upon detection of the heads-up display pivot arm 26 in its neutral position, the processor 116 can provide a power-off signal to a heads-up display controller 146. The heads-up display controller preferably is integrated into the heads-up display module 52 along with the heads-up display 54 that displays an image for viewing by the user. As above indicated, the heads-up display 54 may include a lens positioned in front of a heads-up display screen for creating a virtual screen image appearing many times larger than the physical dimensions of the screen. The screen can be backlit, and the backlighting can be turned off by the processor when the neutral position of the heads-up display pivot arm is reported by the heads-up display pivot arm position sensor 140. Provision can also be made for otherwise turning off the heads-up display, as by means of a display on/off switch or by input of a command to the processor via a keyboard 150 or by speech recognition. In FIG. 11, the keyboard 150 is intended to represent the keypad 36 (FIG. 1), selector devices 47 and 48 (FIG. 1), and any other keys or manual input devices that may be provided for inputting commands or data into the device for processing by the processor 116. Such input devices further can include a touch screen on the heads-up display for touch input of a user selection.

In addition to monitoring the heads-up display arm position sensor 140, the processor 116 further monitors the output of an orientation sensor 156. The orientation sensor 156 may be of any suitable type for sensing a predetermined orientation of the device 20 to enable operation of the device in a speaker phone mode. In particular, the orientation sensor senses whether the device is in or out of an orientation conducive to use of the device as a speaker phone but not in an orientation associated with use of the device as a handset. Preferably, such orientation is a horizontal orientation, as when the device is set on a level surface on its backside. The back side of the heads-up display pivot arm 26 (FIG. 4) may be provided with a flat area for stable (unrocking) resting of the device on a flat surface in a horizontal orientation.

When a horizontal position of the device 20 is reported by the orientation sensor 156 along with the heads-up display arm position sensor 140 reporting a neutral position of the heads-up display pivot arm 26, a speaker phone mode is enabled and can be initiated by a user action such as depressing a specified key or key sequence on the keyboard. When the speaker phone mode is requested by the user, the microprocessor sends an appropriate command to an audio subsystem 160 to increase the volume of the speaker 32 to an appropriate level for speaker phone use. The audio subsystem can also adjust the voice pick-up range of microphone 30 from hand-set use to speaker phone use, thereby enabling pick-up of more distant sounds. The audio subsystem can be of any suitable type and, for example, can comprise an analog signal conditioner 164 connected to the microphone 30 and to the speaker 32 via a speaker driver 166.

The user may turn off the speaker phone mode by pressing a specified key or key sequence on the keyboard 150, upon which the processor 116 may command the audio subsystem 160 to return to the handset mode and lower the volume of the speaker output to a level suitable for listening when the speaker 32 is held adjacent a user's ear as above described. Likewise, the microphone pick-up range may be reduced accordingly. The speaker phone mode also preferably is automatically disabled if the device is moved from its horizontal position and/or the heads-up display pivot arm is rotated from its neutral position.

If the heads-up display arm position sensor 140 detects movement of the heads-up display pivot arm 26 out of the neutral position to a right-hand or left-hand display position, this is reported to the processor 116 which in response performs several functions. One function is to power up the heads-up display module 52. In addition, the processor 116 causes the image to be displayed in the proper orientation for left-hand or right-hand use of the device. That is, the image will be displayed in a first orientation when the heads-up display pivot arm is rotated to a right-hand use position, and to an inverted orientation (reversed top-to-bottom and side-to-side) when the heads-up display pivot arm is rotated to a left-hand use position.

In addition, the processor 116 will vary the logical-to-physical mapping of the functions attributed to the switches 47 and 48 depending on the position of the heads-up display pivot arm. One set of functions are mapped to the switches 47 and 48 when the heads-up display pivot arm is in its neutral position, which functions may be associated with the speaker phone mode of operation. For example, one of the switches, which may be rocker-type switches, may be used to adjust the volume of the speaker up and down, while the other switch may be used to toggle the microphone (audio input) on and off to provide a muting capability. Of course, other functions may be attributed to the switches, as well as the keys of the keypad, as may be desired.

When the heads-up display pivot arm is moved from its neutral position to either its left-hand or right-hand use positions, the processor 116 preferably maps a different set of functions to the switches 47 and 48 that facilitate use of the device in a heads-up display mode. The functions that may be assigned to the switches, which preferably are rocker-type switches, include up and down scrolling of the heads-up display screen by line, page or otherwise, tabbing right or left, providing a yes/no response to a query on the heads-up display screen, allowing the processor 116 to distinguish between a normal telephone speech mode and a system voice command input mode, etc. Because the orientation of the main body portion 24 is reversed left-to-right for left-hand vs. right-hand usage of the device, the processor 116 preferably detects such reversal and reversely maps the logical functions assigned to the switches in order to provide the same user interface regardless of the side of the user's head at which the device is used. For example, when the device is held in the user's right hand, the user's thumb will be positioned to operate the switch 48 to control say a scroll function while the user's index finger will be positioned to operate the switch 47 to control say a toggle function between a normal telephone speech mode and a system voice command mode. However, when the heads-up display pivot arm is rotated for use of the device on the left side of the user's head, the scroll function is mapped to the switch 47 whereby it will be controlled by the users thumb when the main body portion is held in the user's left hand, and the speech mode selector function will be mapped to the switch 48 for operation by the user's index finger.

Preferably, the processor 116 automatically re-maps the logical functions of the switches in response to the position of the heads-up display pivot arm detected by the heads-up display arm position sensor 140. However, alternatively (or additionally) provision can be made for manual selection of the different logical mapping configurations, and even different sets of functions that are being mapped, as may be desired to allow the device to be customized to a particular use or user.

As above mentioned, the processor can provide for selection between a normal telephone speech mode and a system voice command mode. The signal conditioner 164 may include analog-to-digital (A/D) and digital-to-analog (D/A) converters, or may be a device that provides digitization and data compression, and includes microphone automatic gain control (AGC). Alternatively, a dedicated digital signal processor (DSP) may be used, in which case the DSP processor would perform speech decoding, recognition and synthesis. Otherwise, these functions are performed by the processor 116 using an application specific integrated circuit or circuits (ASIC's) and/or software algorithms.

During normal speech mode, the processor 116 would direct transmission of the users voice via the communications module 38 or direct connect communications port 40 to a receiving host PBX system or phone line. Preferably, many or all common telephone functions are supported such as call hold, last number re-dial, phone number storage, voice mail, etc. Also, the keypad 36 and display 34 can be used to place a telephone call and display telephone function related information such as the number being dialed, the last number dialed, call status, etc. Additionally, the display 34 could be configured and operated to display some or all of the information being displayed on the heads-up display 54. The telephone keypad 36 (typically having 12–18 keys) may also be used for inputting a user identification code to validate a user for host data base security purposes. Alternatively or additionally, voice pattern recognition could be used to validate a user before establishing a link with a remote computer.

If the system voice command mode is activated, as by depressing or otherwise actuating the assigned switch 47 or 48, the processor 116 and signal conditioner 164 terminate normal speech mode and effect decoding of any voice input as a command. The command is then either implemented by the processor 116 if a local command or, if a remote command, the command is transmitted by the communications module 38 to a host computer system to which the device is linked for data transmission. The convenient location of the switches 47 and 48 allows the user to easily switch between modes quickly and naturally.

In the illustrated exemplary embodiment, the communications module 38 includes a transceiver 170 which is connected to the antenna 44 for wireless communications. Preferably, the transceiver is a radio transceiver that is interfaced with the processor 116 by a radio controller 172. The radio controller handles the control of the radio link protocol and the message transport protocol system that distinguishes telephone voice data packets and non-voice data packets. In an alternative embodiment, the processor 116 could handle some or all of the functions of the radio controller. The transceiver preferably is operable at data rates of 1 mbps or higher to support data applications along with voice communication, although lower data rates are also feasible. Any suitable type of radio communication, such as local RF or cellular phone communication, can be used. If desired, data encryption can be used on the wireless link for security.

The non-voice data may originate from a remote telephone link, a remote host data link or even a remote Internet link. The non-voice data is processed by the processor 116 as determined by the internal programming of the processor, and received and/or processed data may be displayed on the heads-up display 54 or display 34 for viewing by the user. The processor can have personal computer (PC) compatibility, or other software and/or hardware compatibility as may be desired for a particular application.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A telephone device with integrated heads-up display, comprising:

input and output audio transducers;

a heads-up display;

communications circuitry for receiving and transmitting voice data and non-voice data to and from a remote site;

electronic circuitry for operatively interconnecting said input and output transducers and said heads-up display to said wireless communications circuitry;

a hand-held body structure housing said input and output audio transducers, heads-up display, communications circuitry and electronic circuitry; and a selector device for switching between a normal telephone speech mode and a system voice command input mode.

2. A telephone device with integrated heads-up display, comprising:

input and output audio transducers;

a heads-up display;

communications circuitry for receiving and transmitting voice data and non-voice data to and from a remote site;

electronic circuitry for operatively interconnecting said input and output transducers and said heads-up display to said communications circuitry; and a body structure housing said input and output audio transducers, heads-up display, communications circuitry and electronic circuitry; said body structure including a main body portion and a display body portion, said display body portion including said heads-up display and being mounted to said main body portion for movement between a neutral position and at least one operative position for locating said heads-up display in front of a user's eye when said body structure is positioned adjacent one side of a user's head.

3. A device as set forth in claim 2, wherein said electronic circuitry includes display control circuitry for displaying an image on said heads-up display, and further comprising a sensing device for detecting said display body portion in said neutral position, and said display control circuitry being responsive to an output of said sensing device for powering down said display control circuitry.

4. A device as set forth in claim 2, wherein said heads-up display is covered by said main body portion when said display body portion is in said neutral position.

5. A device as set forth in claim 2, comprising an orientation sensor for sensing a predetermined orientation of said orientation sensor, and said electronic circuitry includes circuitry for increasing the volume of the audio output transducer in response to an output of said orientation sensor, whereby the device can function in a speaker phone mode.

6. A device as set forth in claim 2, wherein said communications circuitry includes a radio transceiver.

7. A device as set forth in claim 6, wherein said radio transceiver operates at data transfer rates of at least 1 mbps.

8. A device as set forth in claim 2, wherein said display body portion includes a display arm pivotally mounted at one end to said main body portion and housing at an opposite end said heads-up display.

9. A device as set forth in claim 8, wherein said display arm has a longitudinal axis extending parallel to a longitudinal axis of said main body portion when said display body portion is in said neutral position, and said display arm extends obliquely to said main body portion when said display body portion is in either one of said first and second operational positions.

10. A device as set forth in claim 8, wherein said display arm is telescopically extendible and retractable to adjust the length thereof.

11. A device as set forth in claim 8, wherein said input and output transducers are housed within said main body portion at opposite first and second ends of said main body portion, respectively, and said display arm is pivotally mounted to said main body portion at said second end thereof.

12. A device as set forth in claim 2, wherein said at least one operative position includes first and second operative positions disposed on opposite sides of said neutral position and respectively associated with use of said device on respective opposite sides of the user's head.

13. A device as set forth in claim 12, wherein said electronic circuitry includes display control circuitry for displaying an image on said heads-up display in either one of first and second orientations relative to said heads-up display, and an image orientation selector for selecting one of said first and second orientations for display of the image.

14. A device as set forth in claim 13, wherein said image orientation selector includes a sensing device for detecting said display body portion in said first and second operative positions, and said display control circuitry is responsive to an output of said sensing device for displaying the image in said first orientation when said sensing device detects said display body in said first operative position and in said second orientation when said sensing device detects movement of said display body portion in said second operative position.

15. A device as set forth in claim 14, further comprising a plurality of selector devices located on opposite side edges of said main body portion, and said electronic circuitry is responsive to the output of said sensing device for mapping a set of functions to said selector devices according to a first arrangement when said sensing device detects said display body portion in said first operative position and mapping the same set of functions to said selector devices according to a second arrangement when said sensing device detects said display body portion in said second operative position.

16. A device as set forth in claim 12, further comprising a sensing device for detecting said display body portion in said first and second operative positions, and a plurality of selector devices located on opposite side edges of said main body portion, and wherein said electronic circuitry is responsive to the output of said sensing device for mapping a set of functions to said selector devices according to a first arrangement when said sensing device detects said display body portion in said first operative position and mapping the same set of functions to said selector devices according to a second arrangement when said sensing device detects said display body portion in said second operative position.

17. A device as set forth in claim 16, wherein said sensing device is operative to detect said display body portion in said neutral position, and said electronic circuitry maps a different set of functions to said selector devices when said display body portion is in said neutral position.

18. A device as set forth in claim 16, wherein said set of functions includes a heads-up display screen scrolling function.

19. A device as set forth in claim 16, wherein said set of functions includes an action selection function.

20. A device as set forth in claim 16, wherein said set of functions includes a toggle function for switching between a normal telephone speech mode and a system voice command input mode.

21. A portable telephone device with integrated heads-up display, comprising:
input and output audio transducers;
a heads-up display;
wireless communications circuitry for receiving and transmitting voice data and non-voice data to and from a remote site;
electronic circuitry for operatively interconnecting said input and output transducers and said heads-up display to said wireless communications circuitry; and
a hand-held body structure housing said input and output audio transducers, heads-up display, wireless communications circuitry and electronic circuitry, the hand-held body structure including a main body portion and a display body portion, said display body portion including said heads-up display which is operative to present an image to a user's eye when said body structure is positioned adjacent one side of a user's head.

22. A device as set forth in claim 21, wherein said communications circuitry includes a radio transceiver.

23. A device as set forth in claim 21, comprising an orientation sensor for sensing a predetermined orientation of said orientation sensor, and said electronic circuitry includes circuitry for increasing the volume of the audio output transducer in response to an output of said orientation sensor, whereby the device can function in a speaker phone mode.

24. A device as set forth in claim 23, wherein said radio transceiver operates at data transfer rates of at least 1 mbps.

25. A device as set forth in claim 21, wherein said display body portion; mounted to said main body portion for movement between a neutral position and at least one operative position for locating said heads-up display in front of a user's eye when said hand-held body structure is held adjacent one side of a user's head.

26. A device as set forth in claim 25, wherein said display body portion includes a display arm pivotally mounted at one end to said main body portion and housing at an opposite end said heads-up display.

27. A device as set forth in claim 25, wherein said at least one operative position includes first and second operative positions disposed on opposite sides of said neutral position and respectively associated with use of said device on respective opposite sides of the user's head.

28. A device as set forth in claim 27, wherein said display arm has a longitudinal axis extending parallel to a longitudinal axis of said main body portion when said display body portion is in said neutral position, and said display arm extends obliquely to said main body portion when said display body portion is in either one of said first and second operational positions.

29. A device as set forth in claim 27, wherein said electronic circuitry includes display control circuitry for displaying the image on said heads-up display in either one of first and second orientations relative to said heads-up display, and an image orientation selector for selecting one of said first and second orientations for display of the image.

30. A device as set forth in claim 29, wherein said image orientation selector includes a sensing device for detecting said display body portion in said first and second operative positions, and said display control circuitry is responsive to an output of said sensing device for displaying the image in said first orientation when said sensing device detects said display body in said first operative position and in said second orientation when said sensing device detects movement of said display body portion in said second operative position.

31. A device as set forth in claim 27, further comprising a plurality of selector devices located on opposite side edges of said main body portion, and said electronic circuitry is responsive to the output of said sensing device for mapping a set of functions to said selector devices according to a first arrangement when said sensing device detects said display body portion in said first operative position and mapping the same set of functions to said selector devices according to a second arrangement when said sensing device detects said display body portion in said second operative position.

32. A device as set forth in claim 31, wherein said sensing device is operative to detect said display body portion in said neutral position, and said electronic circuitry maps a different set of functions to said selector devices when said display body portion is in said neutral position.

33. A device as set forth in claim 31, wherein said set of functions includes a heads-up display screen scrolling function.

34. A device as set forth in claim 31, wherein said set of functions includes an action selection function.

35. A device as set forth in claim 31, wherein said set of functions includes a toggle function for switching between a normal telephone speech mode and a system voice command input mode.

* * * * *